(12) United States Patent
Nakajima et al.

(10) Patent No.: US 12,163,539 B2
(45) Date of Patent: Dec. 10, 2024

(54) VALVE CALIBRATION SYSTEM AND CALIBRATION METHOD

(71) Applicant: Caterpillar SARL, Geneva (CH)

(72) Inventors: Hideki Nakajima, Akashi (JP); Koichi Kiyasu, Akashi (JP)

(73) Assignee: Caterpillar SARL, Geneva (CH)

(*) Notice: Subject to any disclaimer, the term of this patent is extended or adjusted under 35 U.S.C. 154(b) by 295 days.

(21) Appl. No.: 17/798,584

(22) PCT Filed: Feb. 5, 2021

(86) PCT No.: PCT/EP2021/025044
§ 371 (c)(1),
(2) Date: Aug. 10, 2022

(87) PCT Pub. No.: WO2021/160342
PCT Pub. Date: Aug. 19, 2021

(65) Prior Publication Data
US 2023/0078399 A1     Mar. 16, 2023

(30) Foreign Application Priority Data
Feb. 13, 2020   (JP) ................. 2020-022204

(51) Int. Cl.
*F15B 19/00*   (2006.01)
*E02F 9/22*    (2006.01)
(Continued)

(52) U.S. Cl.
CPC .......... *F15B 19/002* (2013.01); *E02F 9/2228* (2013.01); *E02F 9/2235* (2013.01);
(Continued)

(58) Field of Classification Search
CPC  F15B 19/002; F15B 13/0433; F15B 13/0442; F15B 2211/50554;
(Continued)

(56) References Cited

U.S. PATENT DOCUMENTS 6,397,655 B1 *  6/2002  Stephenson ........... F15B 19/002
                                                       73/1.72
9,611,950 B2 *  4/2017  Kenkel ............... F16K 31/0613
(Continued)

FOREIGN PATENT DOCUMENTS

EP  1143152 A2  10/2001
JP  5281573     9/2013

OTHER PUBLICATIONS

International Search Report related to Application No. PCT/EP2021/025044; reported on Apr. 29, 2021.

*Primary Examiner* — David Z Huang (57) ABSTRACT

To achieve improvement in work efficiency of calibration work and improvement in calibration accuracy, by performing control so that the time taken to increase the sweep of an applied current becomes substantially constant, upon the calibration of a valve opening position current value when a valve operated by electrical current applied to an electrical actuator opens a flow passage. There is provided a predicted value calculating means for predicting a calibration value of a valve opening position current value on the basis of information concerning valve opening position current values, and the sweep starting current value is set so that the time taken to increase the sweep to a predicted value predicted by the predicted value calculating means from a sweep start becomes a fixed time.

4 Claims, 6 Drawing Sheets

(51) Int. Cl.
*E02F 9/26* (2006.01)
*F15B 13/043* (2006.01)
*F15B 13/044* (2006.01)
*F16K 37/00* (2006.01)

(52) U.S. Cl.
CPC ............ *E02F 9/2285* (2013.01); *E02F 9/264* (2013.01); *F15B 13/0433* (2013.01); *F15B 13/0442* (2013.01); *F16K 37/0091* (2013.01); *F15B 2211/20546* (2013.01); *F15B 2211/3111* (2013.01); *F15B 2211/327* (2013.01); *F15B 2211/329* (2013.01); *F15B 2211/355* (2013.01); *F15B 2211/40507* (2013.01); *F15B 2211/41563* (2013.01); *F15B 2211/426* (2013.01); *F15B 2211/45* (2013.01); *F15B 2211/50554* (2013.01); *F15B 2211/575* (2013.01); *F15B 2211/6309* (2013.01); *F15B 2211/6313* (2013.01); *F15B 2211/6346* (2013.01); *F15B 2211/6355* (2013.01); *F15B 2211/6652* (2013.01)

(58) Field of Classification Search
CPC ........ F15B 2211/575; F15B 2211/6309; F15B 2211/6313; E02F 9/2228; E02F 9/2235; E02F 9/2285; E02F 9/264; F16K 37/0091
See application file for complete search history.

(56) References Cited

U.S. PATENT DOCUMENTS

2008/0053191 A1     3/2008   Yoo et al.
2009/0277243 A1*   11/2009   Zhang .................. G01F 15/005
                                                                  700/282

* cited by examiner

VALVE CALIBRATION SYSTEM AND CALIBRATION METHOD

CROSS-REFERENCE TO RELATED APPLICATION

This Application is a 35 USC 8371 US Stage filing of International Application No. PCT/EP2021/025044 filed on Feb. 5, 2021 which claims priority under the Paris Convention to Japanese Patent Application No. No. 2020-022204 filed on Feb. 13, 2020.

TECHNICAL FIELD

The present invention relates to a technical field of a valve calibration system and calibration method, the valve being provided in a hydraulic circuit of a work machine such as a hydraulic excavator.

BACKGROUND ART

In general, a hydraulic circuit of a work machine such as a hydraulic excavator may be provided with a valve configured to operate according to electrical current to an electrical actuator to open and close a flow passage. In a case where such a valve is, for example, a control valve configured to control oil supply/discharge to/from hydraulic actuators such as a boom cylinder, a stick cylinder, etc. provided in a hydraulic excavator, and an electromagnetic proportional valve configured to output a pilot pressure to the control valve to actuate the control valve is an electrical actuator, an electrical current is applied to the electromagnetic proportional valve in accordance with the operation of each hydraulic actuator operation tool, so that the pilot pressure is output from the electromagnetic proportional valve and the control valve will open the flow passage routing to the hydraulic actuator. However, an applied current value (valve opening position current value) to the electromagnetic proportional valve when the control valve opens the flow passage differs depending on not only the individual difference (manufacturing tolerance) of the electromagnetic proportional valve, but also the opening characteristics of the control valve or the circuit configuration in which the control valve is arranged, and furthermore the valve opening position current value also changes due to aged degradation of components of the electromagnetic proportional valve and the control valve. Accordingly, the calibration of the valve opening position current value with the valve being disposed in the hydraulic circuit of the work machine will be required.

As such a calibration method of the valve opening position current value, conventionally, there is known a technique for measuring a pressure change on the valve inlet side while increasing the sweep of the electrical current applied to the electrical actuator, in a state where hydraulic pressure of a fixed pressure is supplied to the valve inlet side, and determining the calibration value of the valve opening position current value (cracking point current command) in accordance with the measured pressure change (see, for example, Patent Literature 1).

PRIOR ART LITERATURES

Patent Literatures

[PATENT LITERATURE 1] Japanese Patent No. 5281573

SUMMARY OF THE INVENTION

Problems to be Solved by the Invention

Meanwhile, as disclosed in said Patent Literature 1, in a case where calibration of a valve opening position current value is performed by measuring the pressure while increasing the sweep of electrical current applied to an electrical actuator, there was a problem that the calibration work takes time, resulting in less work efficiency when an increase of sweep of an applied current from the time point of current zero is started. Therefore, it is proposed to preset a sweep starting current value at which the increase of sweep is started, to increase the current at a rapid rate to the sweep starting current value from the current value zero, and to increase the applied current at a predetermined rate suitable for sweeping from the sweep starting current value. However, many valves are provided like a hydraulic circuit provided in a hydraulic excavator. In case of performing calibration of these many valves, if the sweep starting current value is set uniformly, as described above, even if the same types of electrical actuators are used, since the valve opening position current values differ depending not only on individual differences of the electrical actuators but also on various conditions such as opening characteristics of valves and circuits, differences arise between the sweep times until the valve opening position current value is reached from the sweep starting current value. If such differences between the sweep times until the valve opening position current value is reached from the sweep starting current value are large, there are problems that variation between work conditions of calibration works occurs, which hinders the standardization of work and the accuracy improvement. In these points, there are issues to be solved by the present invention.

Means for Solving the Problems

The present invention has been created with an aim of solving these issues in view of the above actual circumstances. According to claim 1 of the present invention, in a hydraulic circuit of a work machine comprising a valve configured to operate according to electrical current applied to an electrical actuator to open and close a flow passage, a valve calibration system is configured to calibrate a valve opening position current value which is applied to the electrical actuator when said valve opens the flow passage, and the valve calibration system comprises: a calibration value predicting means for predicting a calibration value of the valve opening position current value on the basis of information concerning the valve opening position current values; a sweep starting current value setting means for setting a sweep starting current value; a hydraulic pressure supply means for supplying hydraulic pressure of a fixed pressure to the inlet side of the valve; an applied current control means for starting the electrical current application to the electrical actuator to increase the current to the sweep starting current value, and further increasing the sweep of the applied current value to the electrical actuator at a predetermined rate from the sweep starting current value; and a pressure measuring means for measuring a pressure change on the inlet side or outlet side of the valve during the electrical current application to the electrical actuator, wherein it is configured to obtain the calibration value of the valve opening position current value in accordance with the applied current value at the time of the pressure change measured by said pressure measuring means, and wherein said sweep starting current value setting means sets the sweep starting current value depending on the predicted value so that the time taken to increase the sweep from the sweep start to a predicted value predicted by said calibration value predicting means becomes a preset fixed time.

A valve calibration system according to claim 2 of the present invention is the valve calibration system according to claim 1, wherein the calibration value predicting means includes at least one piece of information of calibration information of past valve opening position current values, manufacturing information of electrical actuators and valves, information of work machines on which valves are used, and information of sites where work machines are operational, as the information concerning the valve opening position current values necessary for predicting the calibration value of the valve opening position current value.

A valve calibration system according to claim 3 of the present invention is the valve calibration system according to claim 1 or 2, wherein the information concerning the valve opening position current values is accumulated in a server as big data, and the calibration value predicting means provided in the server predicts the calibration value of the valve opening position current value on the basis of the result of trend analysis of the big data.

According to claim 4 of the present invention, in a hydraulic circuit of a work machine comprising a valve configured to operate according to electrical current applied to an electrical actuator to open and close a flow passage, a valve calibration method for calibrating a valve opening position current value which is applied to the electrical actuator when the valve opens the flow passage comprises the steps of: predicting a calibration value of the valve opening position current value on the basis of information concerning the valve opening position current values; setting a sweep starting current value; supplying hydraulic pressure of a fixed pressure to the inlet side of the valve; starting the electrical current application to the electrical actuator to increase the current to the sweep starting current value, and further increasing the sweep of the applied current to the electrical actuator at a predetermined rate from the sweep starting current value; measuring a pressure change on the inlet side or outlet side of the valve during the electrical current application to the electrical actuator; and obtaining the calibration value of the valve opening position current value on the basis of the applied current value at the time of the measured pressure change, wherein said sweep starting current value is set depending on the predicted value so that the time taken to increase the sweep from the sweep start to a predicted value of a calibration value of said predicted valve opening position current value becomes a preset fixed time.

Favorable Effects of the Invention

According to the inventions of claims 1 and 4, the time taken to increase the sweep of the applied current required for the calibration of the valve opening position current value can be made substantially constant, resulting in the ability to achieve the standardization of the calibration work, and contribute to the improvement in work efficiency and the improvement in calibration accuracy.

According to the invention of claim 2, a predicted value with high accuracy can be obtained.

According to the invention of claim 3, a predicted value with higher accuracy can be surely obtained.

DETAILED DESCRIPTION OF THE INVENTION

Figure 1:
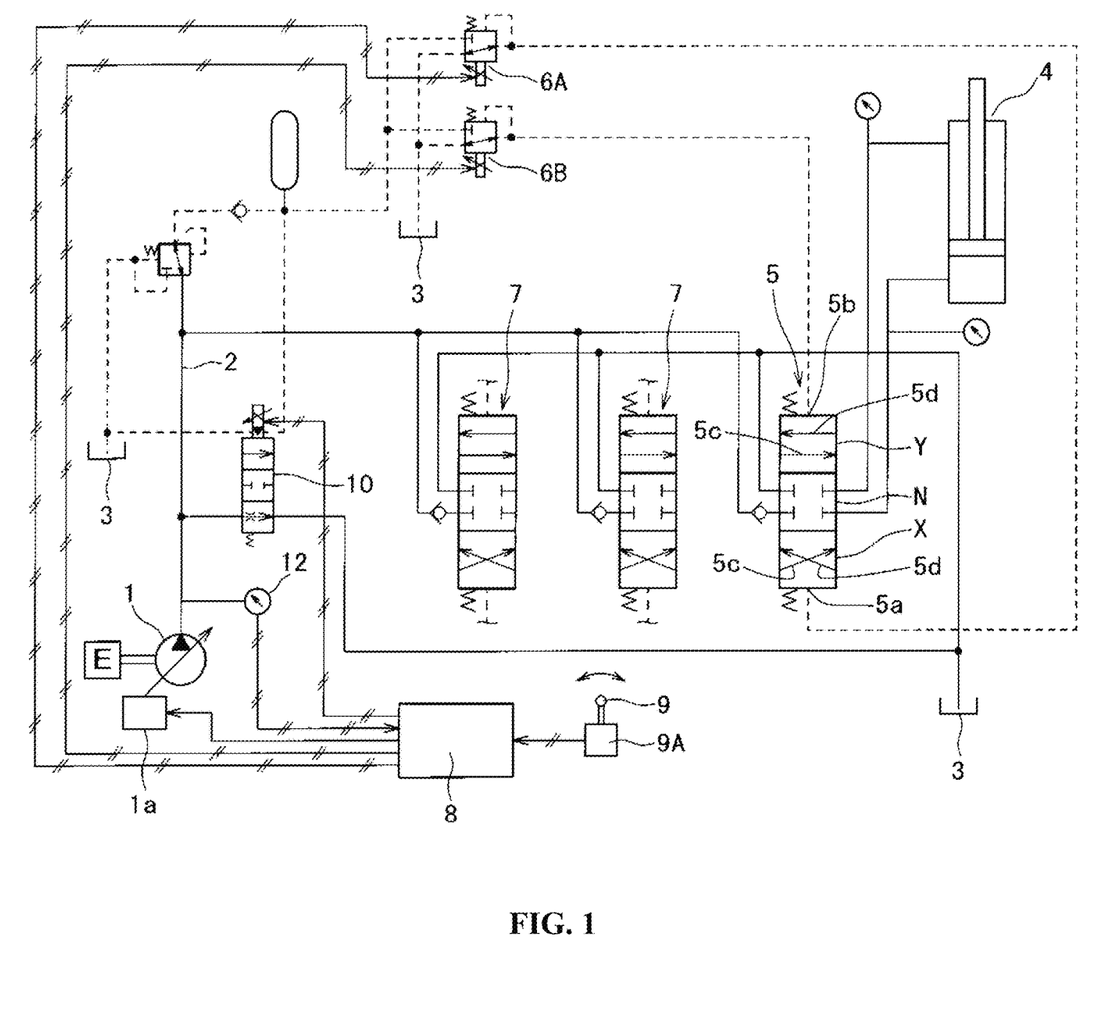
FIG. 1 is a schematic view of a hydraulic circuit of a hydraulic excavator.

Hereinbelow, an embodiment of the present invention will be described with reference to the drawings. FIG. 1 illustrates a schematic view of a hydraulic circuit of a hydraulic excavator which is an example of a work machine. In FIG. 1, reference numeral 1 denotes a hydraulic pump; 1a denotes a capacity-varying means of the hydraulic pump 1; 2 denotes a discharge line of the hydraulic pump 1; 3 denotes an oil tank; 4 denotes a hydraulic cylinder; 5 denotes a pilot-operated control valve configured to perform oil supply/discharge control to/from the hydraulic cylinder 4; and 6A, 6B denote a first and second electromagnetic proportional valves configured to output a pilot pressure to the control valve 5.

In the present embodiment, the control valve 5 corresponds to a valve according to the present invention, and the first and second electromagnetic proportional valves 6A, 6B correspond to electrical actuators according to the present invention. Further, the hydraulic excavator is provided with various hydraulic actuators such as a boom cylinder, a stick cylinder, a bucket cylinder, a traveling motor, and a revolving motor, and provided with a control valve respectively corresponding to each hydraulic actuator, and further provided with an electromagnetic proportional valve configured to output a pilot pressure so as to actuate each control valve. In FIG. 1, however, as representative of these hydraulic actuators, control valves, and electromagnetic proportional valves, only one hydraulic cylinder 4, the control valve 5 corresponding to the hydraulic cylinder 4, the first and second electromagnetic proportional valves 6A, 6B corresponding to the control valve 5, and other two control valves 7 respectively corresponding to the other two hydraulic actuators (not illustrated) are illustrated.

Said control valve 5 is a spool valve comprising first and second pilot ports 5a, 5b, and is located at a neutral position N where a supply flow passage routing from the hydraulic pump 1 to the hydraulic cylinder 4 and a discharge flow passage routing from the hydraulic cylinder 4 to the oil tank 3 are closed, in a state where no pilot pressure is input to both the first and second pilot ports 5a, 5b. However, the control valve 5 is configured such that, by a pilot pressure being input from a first electromagnetic proportional pressure reducing valve 6A or a second electromagnetic proportional valve 6B to the first pilot port 5a or the second pilot port 5b, it is displaced to a first operating position X or a second operating position Y where the supply flow passage 5c routing from the hydraulic pump 1 to the hydraulic cylinder 4 and the discharge flow passage 5d routing from the hydraulic cylinder 4 to the oil tank 3 are opened, to perform supply flow rate control and discharge flow rate control to and from the hydraulic cylinder 4.

Furthermore, in FIG. 1, reference numeral 8 denotes a vehicle-mounted controller, and the controller 8 inputs an operation signal from an operation detecting means 9A for detecting an operation direction and an operation amount of operation tools (operation lever, operation pedal, etc.) 9 for the hydraulic cylinder 4, and applies an electrical current as a control signal to said first and second electromagnetic proportional valves 6A, 6B, in response to an input signal. Then, by the pilot pressure that increases or decreases according to the applied current value being output from the first and second electromagnetic proportional valves 6A, 6B, as described above, the control valve 5 is adapted to be displaced from the neutral position N to the first operating position X or the second operating position Y to perform the supply flow rate control and the discharge flow rate control to and from the hydraulic cylinder 4.

As will be described below, the controller 8 applies an electrical current to the first and second electromagnetic proportional valves 6A, 6B in a state where the operation tools are not operated during the calibration work. In addition, the hydraulic excavator is also provided with operation tools for operating hydraulic actuators other than the hydraulic cylinder 4 and an operation detecting means for detecting the operation of these operation tools. In FIG. 1, only the operation tool 9 and the operation detecting means 9A for the hydraulic cylinder 4 are illustrated.

Furthermore, in FIG. 1, reference numeral 10 denotes a bleed valve for controlling a bleed flow rate flowing from the hydraulic pump 1 to the oil tank 3, and the bleed valve 10 operates so as to reduce the bleed flow rate (including zero bleed flow rate) in accordance with the increase of operation amounts of the operation tool 9 for hydraulic cylinder and operation tools for other hydraulic actuators, in response to a control signal from the controller 8. As will be described below, the controller 8 actuates the bleed valve 10 in a state where the operation tools are not operated during the calibration work.

Next, the calibration system and calibration method of the present invention will be described with reference to FIGS. 2 to 5, taking a calibration work for calibrating a valve opening position current value which is an applied current value to the first electromagnetic proportional valve 6A, when the control valve 5 is displaced from the neutral position N to the first operating position X to open the supply flow passage 5c routing from the hydraulic pump 1 to the hydraulic cylinder 4, as an example.

Figure 2:
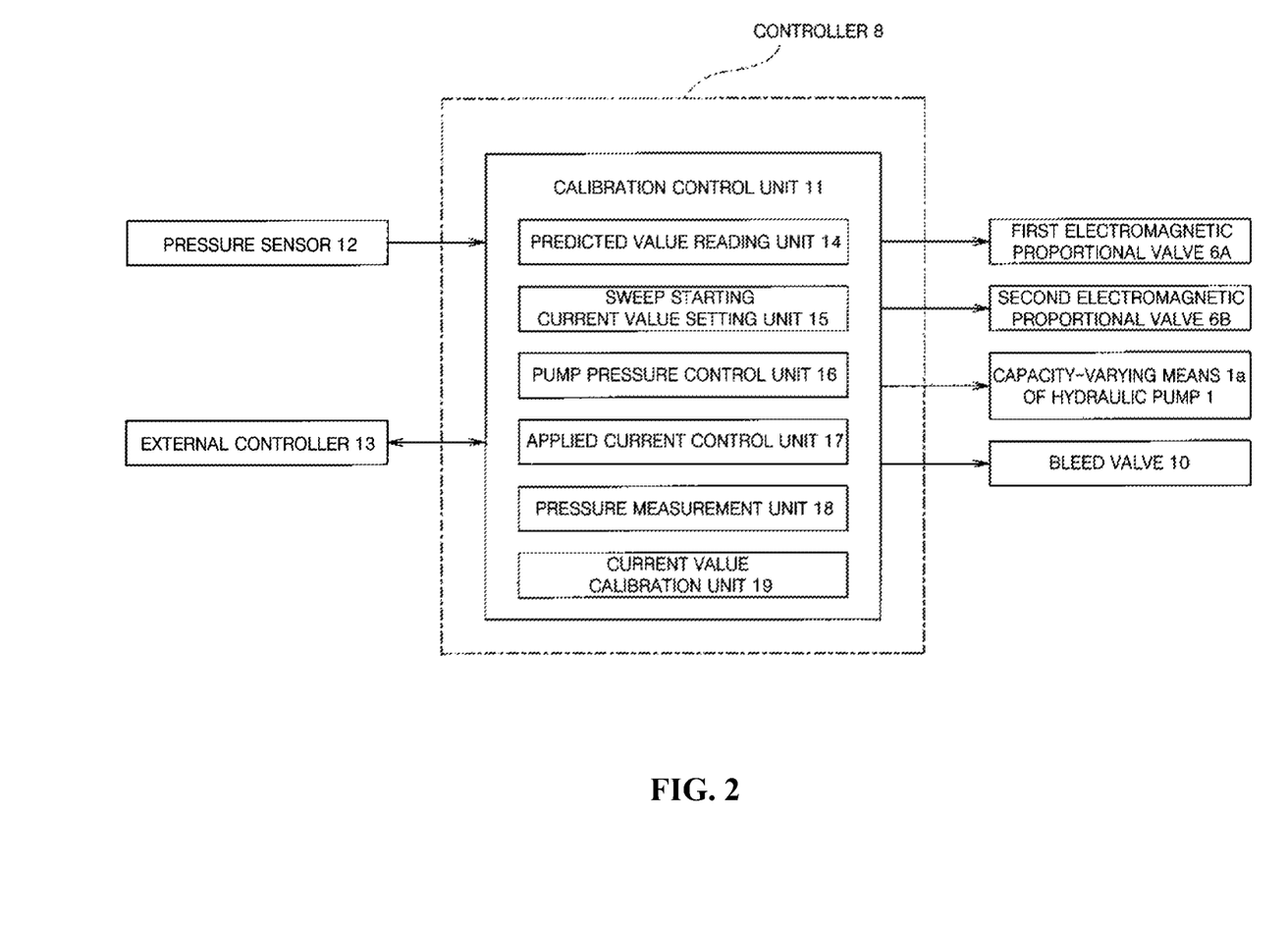
FIG. 2 is a block diagram illustrating a configuration of a calibration control unit.

First, said controller 8 is provided with a calibration control unit 11 configured to control automatic calibration of the valve opening position current value. As illustrated in FIG. 2, a pressure sensor 12 for detecting a pressure of a discharge line 2 of the hydraulic pump 1 is connected to the input side of the calibration control unit 11, and said first and second electromagnetic proportional valves 6A, 6B, the capacity-varying means 1a of the hydraulic pump 1, and the bleed valve 10 are connected to the output side of the calibration control unit 11. Furthermore, the calibration control unit 11 is configured to allow an external controller 13 such as a personal computer that is detachably connected to the controller 8 to be connected thereto so as to be freely inputtable and outputtable, and to comprise a predicted value reading unit 14, a sweep starting current value setting unit 15, a pump pressure control unit 16, and an applied current control unit 17, a pressure measurement unit 18, a current value calibration unit 19, and the like. In FIG. 2, only the portions related to the calibration control unit 11 among the various controls performed by the controller 8 are illustrated. In addition, not only said first and second electromagnetic proportional valves 6A, 6B but also various electrical actuators to be calibrated (for example, electromagnetic proportional valves, etc. that output pilot pressure to another control valve 7) are connected to the output side of the calibration control unit 11, but these are also omitted therein.

Now, said external controller 13 is provided with a display means such as a monitor and an operation means such as a keyboard and a touch panel, and as will be described below, is connected to a server 20. The external controller 13 is adapted to be capable of acquiring the predicted value iE of the calibration value of the valve opening position current value from the server 20; and capable of performing such as start of automatic calibration work by the calibration control unit 11, and selection of the electrical actuators to be calibrated, by the operation means of the external controller 13. The server 20 can be made connectable to the controller 8 via a communication means such as the Internet instead of the external controller 13, and the controller 8 can be provided with a function equivalent to that of said external controller 13.

Further, upon performing calibration of the valve opening position current value, as a preliminary preparation, the pressure of the hydraulic cylinder 4, which is supplied with pressurized oil from the control valve 5, which is subject to calibration, is relieved. In this case, pressure relief may be performed manually, but if a function of relieving pressure by automatically shifting the spool of the control valve 5 is previously imparted, it is effective when assuming an integration into a process of successively performing calibration. Furthermore, the hydraulic oil temperature during the calibration work is manually or automatically controlled to maintain a predetermined temperature range.

Figure 3:
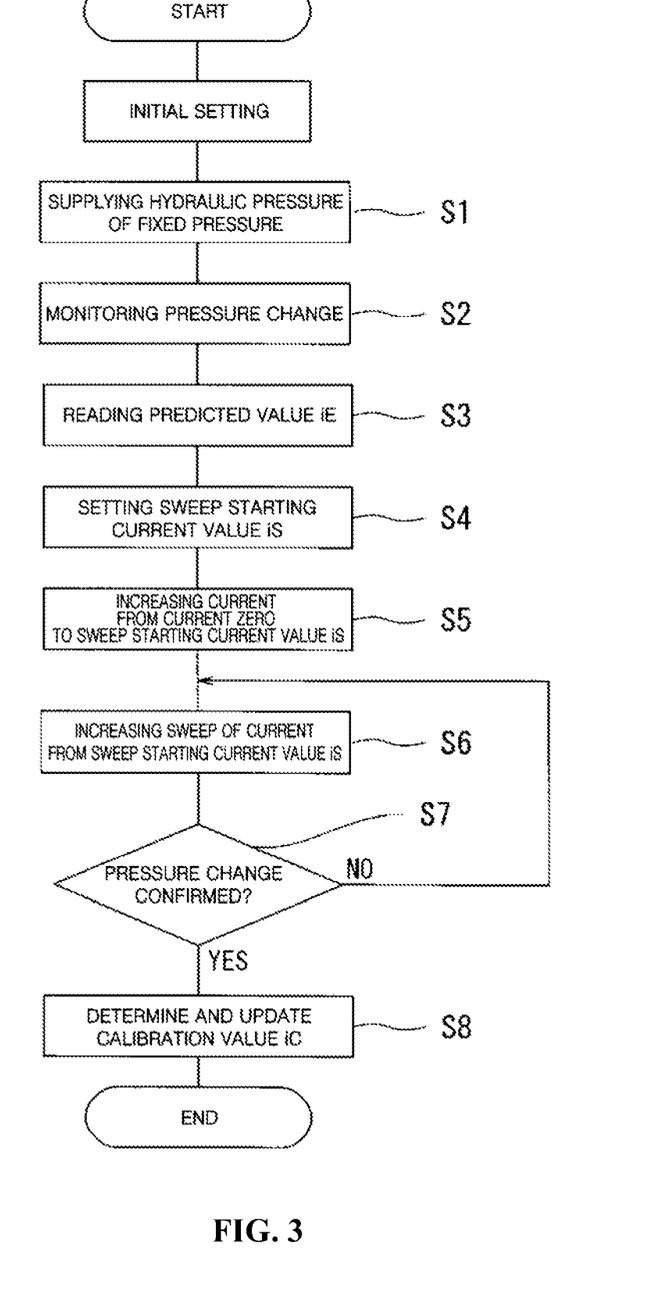
FIG. 3 is a flowchart diagram illustrating a calibration control.

Next, the control of the automatic calibration work performed by said calibration control unit 11 will be described with reference to the flowchart diagram of FIG. 3.

First, when an operation signal for starting the calibration work is input from the external controller 13, a control command is output from the pump pressure control unit 16 to the capacity-varying means 1a of the hydraulic pump 1 and the bleed valve 10, after necessary initial settings are made, and the discharge pressure of the hydraulic pump 1 is held at a preset fixed pressure. As a result, the hydraulic pressure of the fixed pressure is supplied to the inlet side of the control valve 5 (step S1). Said hydraulic pump 1 constitutes a hydraulic pressure supply means of the present invention.

Furthermore, a pressure change on the inlet side of the control valve 5 is monitored by the pressure measurement unit 18, according to a pressure measured value of the discharge line 2 input from the pressure sensor 12 (step S2). The monitoring of the pressure change is performed until the end of the calibration work. Said pressure sensor 12 constitutes a pressure measuring means of the present invention.

Subsequently, reading of a predicted value iE is performed by the predicted value reading unit 14 (step S3). The predicted value iE is the present calibration value of the predicted valve opening position current value of the first electromagnetic proportional valve 6A, and is provided by the server 20 via the external controller 13, but the provision of the predicted value iE by the server 20 will be described below.

Figure 4:
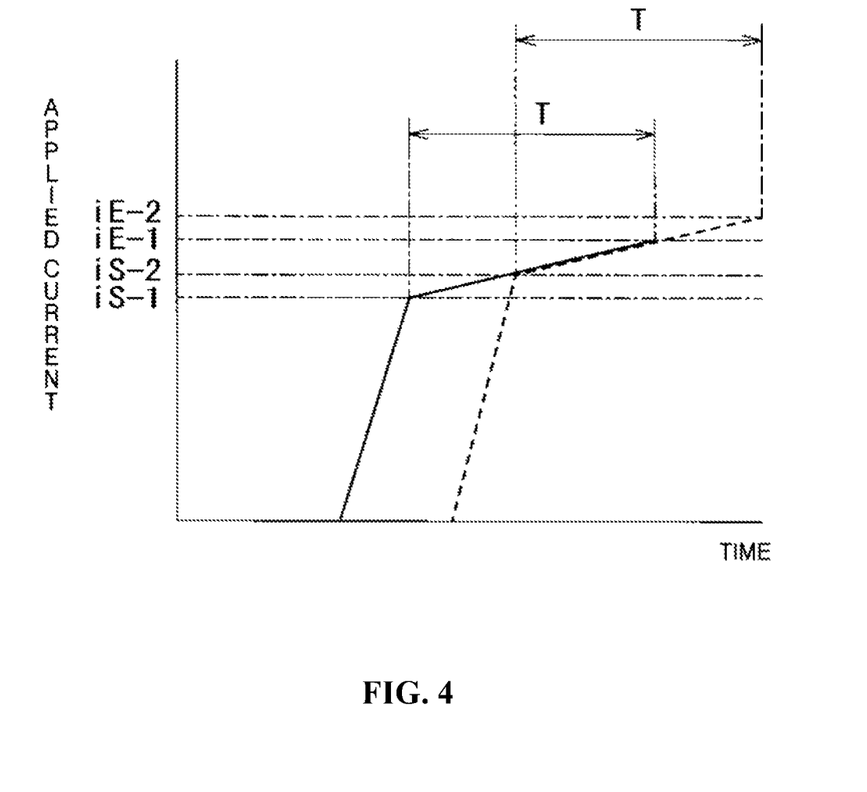
FIG. 4 is a diagram illustrating a sweep time from a sweep starting current value to a predicted value.

Subsequently, setting of a sweep starting current value iS is performed by the sweep starting current value setting unit 15 (step S4). The sweep starting current value iS is a current value when the sweep increase of the applied current described below is started, and the setting of the sweep starting current value iS is set according to said predicted value iE so that a time taken to attain the sweep increase from the sweep start to said predicted value iE becomes the preset fixed time T. In this case, the sweep starting current value iS is calculated by calculating the amount of change of the current value in the fixed time T from an increase rate of the current value at the time of sweeping, and subtracting the amount of change from the predicted value iE. Meanwhile, as illustrated in FIG. 4, even if the predicted values iE have different values of iE-1, iE-2, the sweep time from the sweep starting current values iS-1, iS-2 to the predicted values iE-1, iE-2 is controlled so as to become the fixed time T. Said sweep starting current value setting unit 15 constitutes a sweep starting current value setting means of the present invention.

Subsequently, electrical current application to the first electromagnetic proportional valve 6A by the applied current control unit 17 is started. In this case, the applied current control unit 17 increases the current at a rapid rate (faster than the sweep rate) from the current value zero to said sweep starting current value iS (step S5), and after the sweep starting current value iS is reached, the applied current is swept so as to be increased at a predetermined constant rate suitable for sweeping (step S6).

Since the span from said current value zero to the sweep starting current value iS is outside the span of the present calibration value of the predicted valve opening position current value, the applied current is rapidly increased in order to shorten a calibration work time. Further, said applied current control unit 17 constitutes an applied current control means of the present invention.

While the sweep of said applied current is increasing, the current value calibration unit 19 determines whether or not the pressure change on the inlet side of the control valve 5 is confirmed by the pressure measurement unit 18 (step S7). Then, if no pressure change is confirmed, the sweep increase of said applied current is continued. On the other hand, if the pressure change is confirmed, the current value calibration unit 19 determines the applied current value at the time of said pressure change, as the present calibration value iC of the valve opening position current value, and updates the valve opening position current value with the present calibration value iC (step S8), thus the calibration work of the first electromagnetic proportional valve 6A is completed. After that, in the same manner, the calibration work of the second electromagnetic proportional valve 6B, and the electrical actuators configured to actuate other valves (for example, the electromagnetic proportional valves configured to output the pilot pressure to the other control valves 7) is adapted to be sequentially performed.

Figure 5:
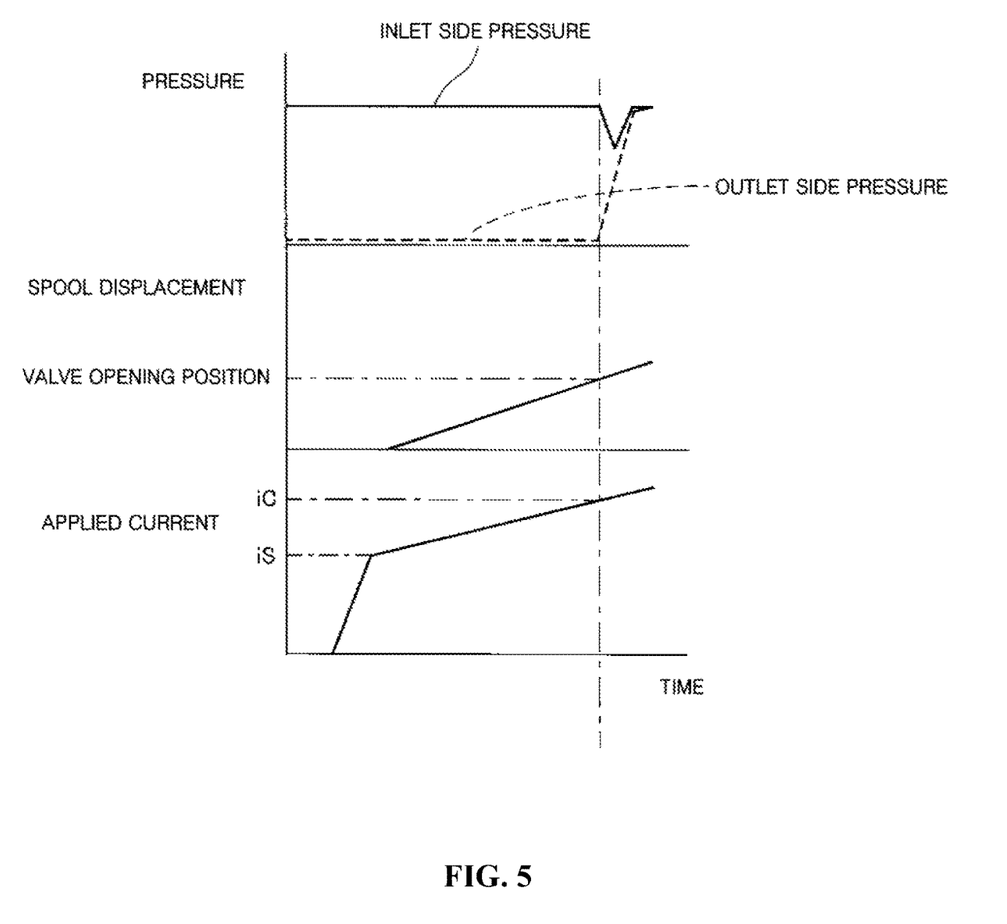
FIG. 5 is a diagram illustrating a relationship among valve inlet side pressure (or outlet side pressure), spool displacement and applied current value.

Now, FIG. 5 illustrates a relationship among the inlet side pressure (measured value of the pressure sensor 12) of the control valve 5 in said steps S5 to S8, the spool movement amount of the control valve 5, and the current value applied to the first electromagnetic proportional valve 6A. As illustrated in FIG. 5, when the sweep of the applied current to the first electromagnetic proportional valve 6A is increased from the sweep starting current value iS, the spool of the control valve 5 starts to move and reaches the valve opening position where the supply flow passage 5c is opened. Then, when the spool reaches the valve opening position, the pressure on the inlet side of the control valve 5 suddenly decreases, and the applied current value when the pressure starts to decrease is determined as the calibration value iC of the valve opening position current value.

In the present embodiment, it is configured such that the calibration value iC of the valve opening position current value is obtained by the inlet side pressure of the control valve 5, but as shown with a dotted line in said FIG. 5, the calibration value iC of the valve opening position current value can also be obtained, by measuring the pressure change on the outlet side of the control valve 5.

Further, in the present embodiment, it is configured such that the applied current value when the inlet side pressure of the control valve 5 starts to decrease is set as the valve opening position current value, but the current value that is offset-corrected from the applied current value when the inlet side pressure of the control valve 5 starts to decrease can also be used as the valve opening position current value. In this case, the offset correction amount is appropriately set depending on the opening characteristics of the valve, a load exerted on the hydraulic actuators supplied with pressurized oil from the valve, circuit configuration, etc.

Figure 6:
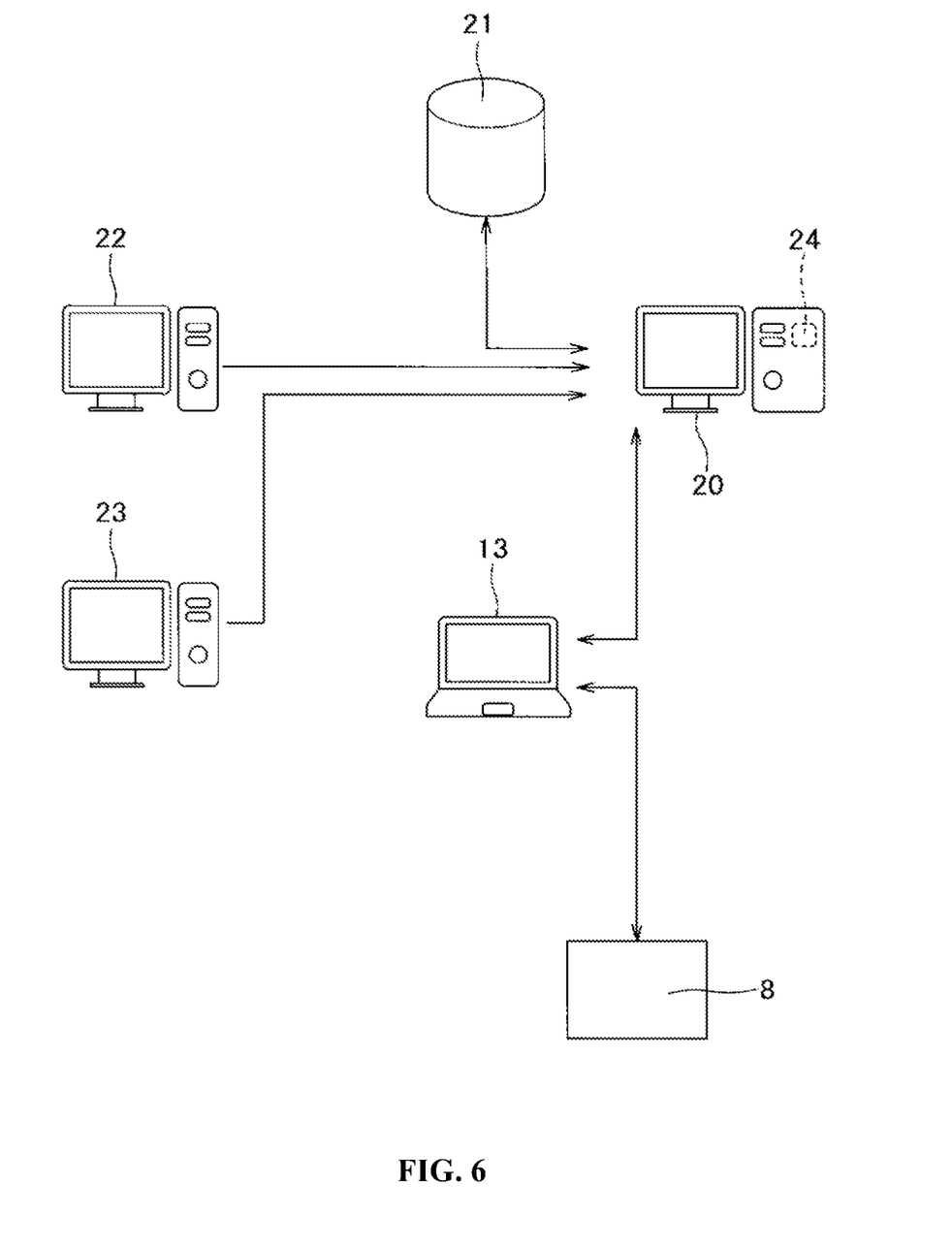
FIG. 6 is a diagram illustrating input/output of a server.

Next, the server 20 configured to provide the predicted value iE of the calibration value of said valve opening position current value will be described. As illustrated in FIG. 6, various pieces of information from a database 21 in which the calibration data of the past valve opening position current values is accumulated, a manufacturer terminal 22 of the electromagnetic proportional valves 6A, 6B and the control valve 5, a manufacturer terminal 23 of the work machine (hydraulic excavator in the present embodiment) in which the control valve 5 is used, etc. are input to the server 20, and site information (atmospheric temperature, atmospheric pressure, etc.) where the work machine is operational is input via said external controller 13. In this case, the information input from the manufacturer terminal 22 of the control valve 5 and the electromagnetic proportional valves 6A, 6B includes, for example, manufacturing site environments (atmospheric temperature, etc.), specifications, shipping inspection information of lots or individuals. The information input from the manufacturer terminal 23 of the work machine includes, for example, manufacturing site environments, specifications, hydraulic oil types, shipping inspection information of lots or individuals, aging information, etc.

Then, said server 20 accumulates various input information as big data related to calibrations of the valve opening position current values, and the big data is subjected to trend analysis after a learning period has passed, by the predicted value calculating means (corresponding to the calibration value predicting means of the present invention) 24 provided in the server 20, and calibration values of the valve opening position current values are predicted for individual electrical actuators provided in the hydraulic excavator on the basis of the analysis result. Then, the predicted result is provided to the vehicle-mounted controller 8 via the external controller 13 as the predicted value iE of the calibration value of the valve opening position current value, at the time of the calibration work of individual electrical actuators.

In the present embodiment configured as described above, a calibration system is used, for example, to calibrate the valve opening position current value which is the applied to the first electromagnetic proportional valve 6A (electrical actuator) when the control valve 5 (valve) provided in the hydraulic circuit of the hydraulic excavator opens the supply flow passage 5c. The calibration system, however, comprises the predicted value calculating means 24 for predicting the calibration value of the valve opening position current value on the basis of the information concerning the valve opening position current values, the sweep starting current value setting unit 15 configured to set the sweep starting current value iS, the hydraulic pump 1 for supplying the hydraulic pressure of a fixed pressure to the inlet side of the valve, the applied current control unit 17 configured to start electrical current application to the electrical actuator to increase the current to the sweep starting current value iS, and furthermore increases the sweep of the applied current value to the electrical actuator at a predetermined rate from the sweep starting current value iS, and the pressure sensor 12 for measuring the pressure change on the inlet side of the valve during the electrical current application to the electrical actuator, wherein the calibration value iC of the valve opening position current value will be obtained on the basis of the applied current value at the time of the pressure change measured by said pressure sensor 12. In valve calibration system, said sweep starting current value setting unit 15 will set the sweep starting current value iS depending on the predicted value iE so that the time taken to increase the sweep from the sweep start to the predicted value iE predicted by said predicted value calculating means 24 becomes the preset fixed time T.

As described above, in the present embodiment, upon the calibration of the valve opening position current value, the calibration value of the valve opening position current value is predicted on the basis of the information concerning the valve opening position current values, and the sweep starting current value iS will be set so that the time taken to increase the sweep from the sweep start to the predicted value iE becomes a fixed time T, depending on the iE. In this case, since the predicted value iE is a value obtained by predicting a calibration value iC of the valve opening position current value and is a value close to the calibration value iC, the time actually taken to increase the sweep from the sweep start to the calibration value iC at the time of calibration becomes a value close to said fixed time T.

As a result, the time taken to increase the sweep of the applied current value to the electrical actuator at the time of calibration can be set to an approximately fixed time (approximate value of the fixed time T), regardless of type and individual difference of the electrical actuator, opening characteristics of the valve, circuit configuration, or aged deterioration of the electrical actuator or the valve. Meanwhile, even a work machine such as a hydraulic excavator provided with a number of valves and electrical actuators for actuating the valves can reduce as much as possible differences in sweep times required for calibrating the valve opening position current value of each valve, can achieve standardization of the calibration work, and can contribute to improvement in the work efficiency and improvement in the calibration accuracy.

In this valve calibration system, said predicted value calculating means 24 (calibration value predicting means) includes at least one piece of information of calibration information of past valve opening position current values, manufacturing information of electrical actuators or valves, information of work machines in which valves are used, and information of sites where work machines are in operational, as the information necessary for predicting the calibration value of the valve opening position current value, thereby enabling the predicted value iE with a high accuracy to be obtained on the basis of these pieces of information.

Furthermore, in the present embodiment, information concerning the valve opening position current values is accumulated in a server 20 as big data, and the predicted value calculating means 24 provided in the server 20 forms a configuration that predicts the calibration value of the valve opening position current value, on the basis of the result of trend analysis of the big data. Accordingly, the predicted value iE with higher accuracy can be surely obtained.

The present invention is not limited to the above embodiment, as a matter of course, and the calibration system and the configuration method of the present invention can be implemented for the calibrations of not only control valves provided in hydraulic circuits of hydraulic excavators but also various types of valves for use in various work machines. Also, a valve to be calibrated and an electrical actuator for actuating the valve are not limited to the valve and the electrical actuator separately arranged as in the above embodiment, but the valve and the electrical actuator may be integrally arranged.

Furthermore, in the present embodiment, it is configured such that communication between the server and the vehicle-mounted controller is adapted to be performed via an external controller such as a personal computer, and the calibration work is started in accordance with the operation of the external controller. However, without being limited to this, for example, if a monitor device provided with an operation means is disposed in the driver's cab of the work machine, it is possible to configure so as to perform the start and progress of the calibration work, selection of the valve to be calibrated by using the operation means of the monitor device. It is also possible to configure so as to automatically perform the calibration work, for example, at every predetermined operating time of the work machine. Furthermore, by mounting the communication device on the work machine, it is also possible to configure so as to perform the calibration work by communicating with the server without going through the external controller.

Furthermore, in the present embodiment, the predicted value iE predicted by the calibration value predicting means provided in a server is read into the vehicle-mounted controller 8, while the sweep starting current value setting means (sweep starting current value setting unit 15) provided in the controller 8 is configured to set the sweep starting current value iS, but the sweep starting current value setting means for calculating and setting the sweep starting current value iS on the basis of the predicted value iE may be provided on the server side, and it is possible to cause the controller 8 to read the sweep starting current value iS set by the sweep starting current value setting means of the server.

INDUSTRIAL APPLICABILITY

The present invention can be used for calibration of a valve configured to operate according to electrical current applied to an electrical actuator.

The invention claimed is:

1. In a hydraulic circuit of a work machine comprising a valve configured to operate according to electrical current applied to an electrical actuator to open and close a flow passage, a valve calibration system configured to calibrate a valve opening position current value which is applied to the electrical actuator when said valve opens the flow passage, the valve calibration system comprising:
    a calibration value predicting means for predicting a calibration value of the valve opening position current value on the basis of information concerning the valve opening position current values;
    a sweep starting current value setting means for setting a sweep starting current value;
    a hydraulic pressure supply means for supplying hydraulic pressure of a fixed pressure to the inlet side of the valve;
    an applied current control means for starting the electrical current application to the electrical actuator to increase the current to the sweep starting current value, and further increasing the sweep of the applied current value to the electrical actuator at a predetermined rate from the sweep starting current value; and a pressure measuring means for measuring a pressure change on the inlet side or outlet side of the valve during the electrical current application to the electrical actuator, wherein it is configured to obtain the calibration value of the valve opening position current value in accordance with the applied current value at the time of the pressure change measured by said pressure measuring means, and wherein said sweep starting current value setting means sets the sweep starting current value depending on the predicted value so that the time taken to increase the sweep from the sweep start to a predicted value predicted by said calibration value predicting means becomes a preset fixed time.

2. The valve calibration system according to claim 1, wherein the calibration value predicting means includes at least one piece of information of calibration information of past valve opening position current values, manufacturing information of electrical actuators and valves, information of work machines on which valves are used, and information of sites where work machines are operational, as the information concerning the valve opening position current values necessary for predicting the calibration value of the valve opening position current value.

3. The valve calibration system according to claim 1, wherein the information concerning the valve opening position current values is accumulated in a server as big data, and the calibration value predicting means provided in the server predicts the calibration value of the valve opening position current value on the basis of the result of trend analysis of the big data.

4. In a hydraulic circuit of a work machine comprising a valve configured to operate according to electrical current applied to an electrical actuator to open and close a flow passage, a valve calibration method for calibrating a valve opening position current value which is applied to the electrical actuator when said valve opens the flow passage, the valve calibration method comprising the steps of:

predicting a calibration value of the valve opening position current value on the basis of information concerning the valve opening position current values;

setting a sweep starting current value;

supplying hydraulic pressure of a fixed pressure to the inlet side of the valve;

starting the electrical current application to the electrical actuator to increase the current to the sweep starting current value, and further increasing the sweep of the applied current to the electrical actuator at a predetermined rate from the sweep starting current value;

measuring a pressure change on the inlet side or outlet side of the valve during the electrical current application to the electrical actuator; and obtaining the calibration value of the valve opening position current value on the basis of the applied current value at the time of the measured pressure change, wherein said sweep starting current value is set depending on the predicted value so that the time taken to increase the sweep from the sweep start to a predicted value of a calibration value of said predicted valve opening position current value becomes a preset fixed time.

* * * * *